(12) United States Patent
Fields et al.

(10) Patent No.: US 8,543,430 B1
(45) Date of Patent: Sep. 24, 2013

(54) SYSTEMS AND METHODS FOR PROVIDING CUSTOMIZED MARKETING INFORMATION

(75) Inventors: Mike Fields, Bloomington, IL (US); Robert T. Trefzger, Bloomington, IL (US); Ramakrishna Duvvuri, Bloomington, IL (US); Tim G. Sanidas, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 8 days.

(21) Appl. No.: 13/196,075

(22) Filed: Aug. 2, 2011

(51) Int. Cl.
*G06Q 40/00* (2012.01)
*G06Q 40/08* (2012.01)

(52) U.S. Cl.
CPC ..................................... *G06Q 40/08* (2013.01)
USPC ............ 705/4; 705/2; 705/3; 705/40; 705/30; 705/315; 705/7.36

(58) Field of Classification Search
USPC ................. 705/26, 4, 10, 14, 2, 3, 40, 30, 35, 705/315, 7.36
See application file for complete search history.

(56) References Cited

U.S. PATENT DOCUMENTS 7,451,097 B1 * 11/2008 Faupel et al. ...................... 705/4
7,734,484 B2 * 6/2010 Lutnick et al. .................... 705/4
8,175,898 B1 * 5/2012 Lagasse et al. .................... 705/4
2003/0233260 A1 * 12/2003 Snell et al. ......................... 705/4
2004/0128147 A1 * 7/2004 Vallinayagam et al. ........... 705/1
2004/0248201 A1 * 12/2004 Muyldermans et al. ....... 435/7.1

OTHER PUBLICATIONS

Estimating the Impact of State Health Insurance Mandates on Premium Costs in the Individual Market; LaPierre, Tracey A; Conover, Christopher J; Henderson, James W; Seward, J Allen; Taylor, Beck A; Journal Insurance Regulation v27n3 pp. 3-36; Spring 2009.*
Subsidization and choice in the group health insurance market; Ma, Yu-Luen; Browne, Mark; Journal of Risk and Insurance, 72, 3, 413(27); Sep. 2005.*

* cited by examiner

*Primary Examiner* — Tien Nguyen
(74) *Attorney, Agent, or Firm* — King & Spalding L.L.P.

(57) ABSTRACT

Computer implemented systems and methods for providing customized pricing information based on limited personal data comprising receiving non-identifying demographic information about a prospective customer; receiving non-identifying location information about the prospective customer; receiving non-identifying information about a property of the prospective customer; automatically identifying a comparable segment of existing customers based on the non-identifying demographic information, the non-identifying location information, and the non-identifying information about the property of the prospective customer; automatically determining representative pricing information based on prices paid by existing customers in the comparable segment of existing customers; and generating displayable content comprising the representative pricing information. The displayable content may further comprise comparable rating and products information.

10 Claims, 9 Drawing Sheets

Personal Information 210

First Name
Last Name

Address

City
State
ZIP

Date of Birth
Driver's License Number

First Vehicle Information 220

Make
Model
Year
Mileage

Work Address
Vehicle ID (VIN)

City
State
ZIP

Discounts Information 230

Have you had an accident in the last 3 years? [No ▼]
Does your vehicle have Anti Theft protection? [No ▼]
Will you be insuring multiple vehicles? [No ▼]
Are you interested in insuring your home? [No ▼]

[Next . . .]

| Personal Information | | 510 |
|---|---|---|
| Gender | Female ▼ | |
| Age | 35 ▼ | |

| Vehicle Information | | 520 |
|---|---|---|
| Make | Honda ▼ | |
| Style | All 4-Door Models ▼ | |
| Year | 2005 ▼ | |

| General Information | | 530 |
|---|---|---|
| Have you had an accident in the last 3 years? | No ▼ | |
| Does your vehicle have Anti Theft protection? | No ▼ | |
| Will you be insuring multiple vehicles? | No ▼ | |
| Are you interested in insuring your home? | No ▼ | |

Your Location                                540

ZIP: 61704          USE CURRENT LOCATION

Get Price!

*FIG. 5*

| | |
|---|---|
| Based on your profile, you are likely to pay $338.69 every 6 months in insurance premiums. | 610 |
| Customers Like You™ saved an average of $120 by switching from OtherInsCo. | 615 |

Typical coverage levels      620

- ☑ Bodily Injury Coverage    with $100,000 (Limit per Person) / 622 $300,000 (Limit per Occurrence).
- ☑ Collision Coverage    with $500 Overall Deductible.
- ☑ Comprehensive Coverage    with $0 Overall Deductible.
- ☑ Medical Payments Coverage    with $5,000 Limit (Per Occurrence).
- ☑ Property Damage Coverage    with $100,000 Limit (Per Occurrence).
- ☑ Under Insured Driver Coverage    with $100,000 (Limit per Person) / $300,000 (Limit per Occurrence).
- ☑ Uninsured Driver Coverage    with $100,000 (Limit per Person) / $300,000 (Limit per Occurrence).
- ☐ Death and Dismemberment Coverage    was not chosen by peer customers.
- ☑ Emergency Roadside Service Coverage    with 100% of Fair Market Value.
- ☐ Rental Reimbursement Coverage    was not chosen by peer customers.

621

Other products purchased by Customers Like You™      630

- ☐ Term Life Insurance *with a 15 year term at $250,000*
- ☐ Umbrella Insurance *with $1,000,000 (limit per occurrence)* — 632
- ☐ Roth Individual Retirement Account — 631

[ Recalculate ] — 641    [ Get a quote online ] — 640

[ Find an agent near me ]

| Customers Like You™ who recently purchased auto insurance at InsCo, paid an average of $338.69 every 6 months. | 610 |

| Customers Like You™ saved an average of $35.12 per month by switching to InsCo. | 615 |

Typical coverage levels     620

☑ Bodily Injury Coverage    with $100,000 (Limit per Person) / $300,000 (Limit per Occurrence). — 622

☑ Collision Coverage    with $500 Overall Deductible.

☑ Comprehensive Coverage    with $0 Overall Deductible.

☑ Medical Payments Coverage    with $5,000 Limit (Per Occurrence).

☑ Property Damage Coverage    with $100,000 Limit (Per Occurrence).

☑ Under Insured Driver Coverage    with $100,000 (Limit per Person) / $300,000 (Limit per Occurrence).

☑ Uninsured Driver Coverage    with $100,000 (Limit per Person) / $300,000 (Limit per Occurrence).

☐ Death and Dismemberment Coverage    was not chosen by peer customers.

☑ Emergency Roadside Service Coverage    with 100% of Fair Market Value.

☐ Rental Reimbursement Coverage    was not chosen by peer customers.
621

Other products purchased by Customers Like You™     630

Term Life Insurance *with a 15 year term at $250,000*
    Umbrella Insurance *with $1,000,000 (limit per occurrence)* — 632
    Roth Individual Retirement Account — 631

[ Get a quote online ] — 640
[ Find an agent near me ]

*FIG. 6B*

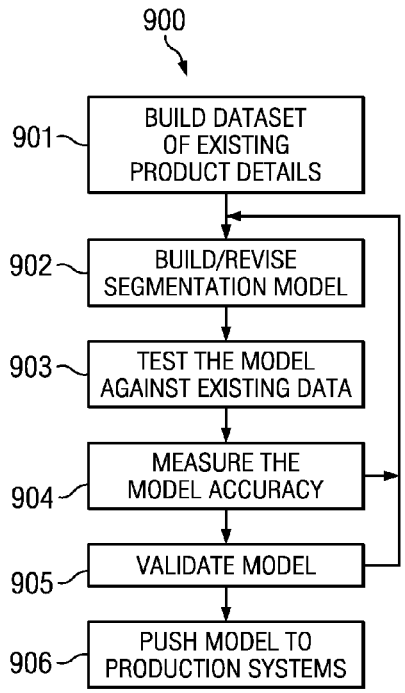
*FIG. 9*
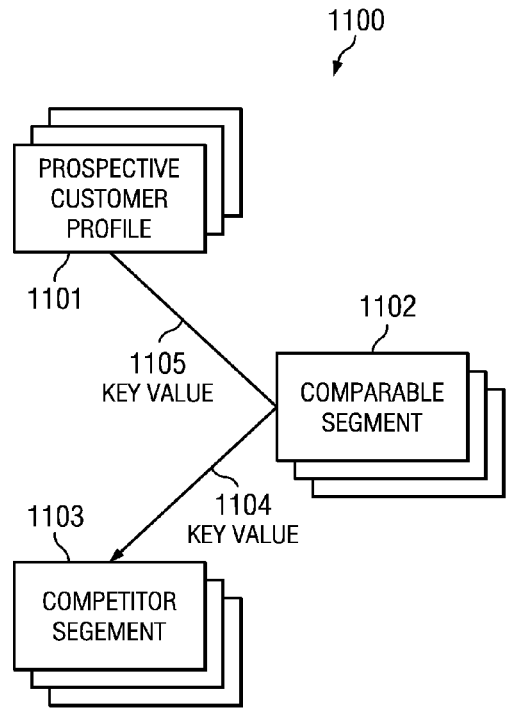
*FIG. 11*
*FIG. 10*

SYSTEMS AND METHODS FOR PROVIDING CUSTOMIZED MARKETING INFORMATION

TECHNICAL FIELD

The present disclosure relates generally to systems and methods for automatically providing customized pricing and product information based on limited personal data.

BACKGROUND

Business entities that provide products and services have limited opportunities to inform prospective customers about their products and services so as to entice the prospective customers to purchase. Many products, including insurance and other financial products and services, cannot be accurately priced or responsibly suggested until a prospective customer has provided a substantial quantity of relevant, personal information. In such cases, prospective customers are required to fill out a "long form" so that all of the necessary personal information can be used as a basis for the quote. This requirement is a barrier to initial sale, cross-sell, up-sell, and replacement sale opportunities, because prospective customers are unwilling to invest the time and energy needed to complete the long form or to disclose the personal information. Initial sale, cross-sell, up-sell, and replacement sale opportunities may be triggered by life-events (e.g., a marriage or birth of a child) or by a marketing campaign. Prospective customers may be motivated to shop for the relevant products or may simply be curious. They may be interested in comparison shopping across multiple product providers or not. In any event, prospective customers are typically busy and wary of providing personal and/or sensitive information in a presale context.

In one example of such a barrier, a property and casualty insurer ("InsCo") may seek to sign up uninsured (or underinsured) individuals and may seek to coax presently insured individuals to replace their current coverage with products that InsCo offers. However, to provide an accurate quote for an insurance policy, a prospective customer may need to answer dozens of questions. For an automobile insurance policy, these questions may include: where the prospective customer lives and works, the prospective customer's approximate credit rating, information about the number and types of automobiles, the prospective customer's age and gender, and information necessary for conducting some level of background check (e.g., a driver's license number).

In another example, a diversified financial services business entity ("FinCo") may offer a number of life insurance, retirement, and investment products. This broad product offering may be difficult to navigate for a prospective customer. However, to narrow the product offerings in a helpful and appropriate way, FinCo would need to conduct a careful needs analysis requiring the prospective customer to answer dozens of questions. Specifically, the needs analysis questioning would gather information about income, assets, liabilities, risk tolerance, family relationships, and so on.

FIG. 1 illustrates a prior art computer interface for gathering long-form information from a prospective customer. This computer interface may be, for example, a form on a publicly accessible web page that allows a prospective customer to obtain a quote and possibly purchase an insurance policy. (The culmination of the purchase process is commonly referred to as "binding" because the policy forms a binding contract between the carrier and the customer.) For purposes of this discussion, it will be assumed (to simplify the discussion) that InsCo has provided the computer interface as a self-service option for prospective customers to purchase insurance at any time and from any computer accessible to the Internet.

The information requested in long form 200 may include personal information 210, property information 220, and other information 230. Personal information 210 typically includes sufficient information to uniquely identify a prospective customer and to specifically determine where the prospective customer lives. Personal information 210 may be used by InsCo to access internal or external databases of information such as (or relating to) prior insurance claims, existing judgments and liens, criminal history, and credit information.

Property information 220 typically includes sufficient information to identify all characteristics of a particular property that are relevant to the processes of rating and/or underwriting insurance coverage for that property. For example, long-form information for an automobile insurance policy may include questions such as the make, model, year, and current mileage of the vehicle. The vehicle identification number (VIN) may also be requested along with the address where the primary driver works. This information may be used to estimate likely repair costs, claim history, and risk of being involved in an accident while the primary driver is commuting. Experience has shown that some prospective customers may not know all of this information and may need to even walk to their car to determine its current mileage, VIN number, etc.

In another example, long-form information for a homeowner's policy may include questions such as the property address, construction materials for various aspects of the property, square footage, build quality, special features (e.g., pools, garages, and out-buildings) availability and utilization of security systems, and the distance to a fire hydrant and fire station. Some of this information may be used to access external databases of information relating to prior insurance claims for the property, appraisal values, crime, weather, and other factors relevant to the risks associated with insuring the property. Property information 220 may be used in combination with externally sourced data to estimate likely reconstruction costs, value of personal belongings, and risk of fire and other perils. Experience has shown that some prospective customers may not know all of this information and may need to reference various documents and examine their property before completing this information.

Other information 230 may include questions relating to typical surcharges, coverage options, or discount programs. For example, for an automobile insurance policy, InsCo may ask about the prospective customer's prior accident history, the existence of an anti-theft system (e.g., alarm or tracking/disabling system), and the possibility of a multi-car or multi-policy discount. In another example, for a homeowner's policy, InsCo may ask about prior claims, a monitored security alarm, and the possibility of multi-policy discounts.

Once a prospective customer has completed long-form 200, indicated by clicking the "Next" button, an online rating system may be provided by InsCo to gather any required external data and calculate a rate for a policy to cover the identified property. A premium may then be calculated based on that rate in conjunction with any selected policy coverages, limits, deductibles, and/or options.

FIG. 2 illustrates a prior art process flow for quoting property and casualty business. Process flow 300 is entered at P&C Start 301. The process begins with collection of personal identification and contact information 302, which corresponds with personal information 210. The process continues with collection of property information 303, which corresponds to property information 220. Additional data, such as that collected in other information 230, may also be collected prior to the next step of process 300. The process continues by retrieving existing data 304. The existing data may be internal data and/or external data representing or derived from historical data. At this point, the information collected and gathered in steps 302-304 is fed into a rating engine to generate a rate 305, which represents the risk exposure to InsCo of covering the identified property and/or associated liability for the prospective customer. For many insurance products, the price of the product may depend on a number of coverages, limits, and/or deductibles selected by a prospective customer at 306. Once these selections have been made, a quote is generated at 307. The customer may choose to change his or her selections to adjust the policy premium (e.g., price) or may choose to accept the policy at 308. There are a number of restrictions that limit insurance carriers' ability to suggest coverages, limits, and/or deductibles, thus a prospective customer may be left to self-advise as to which options are appropriate to select based solely on price.

The final step in the process is to bind the policy at step 309, which typically requires payment of at least a portion of the premium. Process flow 300 may vary for different products and for different insurance carriers. Some products and/or carriers may require an underwriting step prior to binding a policy.

FIG. 3 illustrates a prior art process flow for performing a needs analysis of a prospective customer with respect to certain life insurance, retirement, and investment products offered by FinCo. Process flow 400 starts at NA Start 401. The process begins by collecting personal information and contact information 402, which corresponds with personal information 210. Next, personal financial information is collected at step 403, which may include summary or detailed information about personal and/or family income, assets, and liabilities. The process continues by collecting answers to a questionnaire 404 aimed at generating a risk profile for the prospective customer. Based on the prospective customer's financial and risk profile information, the process may identify appropriate products at step 405, based at least in part on local, state, and/or federal rules and regulations as well as internal guidelines. These products may then be presented to the prospective customer at step 406 as a menu or proposal. Depending on the specific products, the process may continue with an underwriting process or may allow immediate purchase and/or investment.

Experience has shown that prospective customers tend to lose interest in obtaining a quote and stop providing information at various points in the process. In some instances, prospective customers appear to be unwilling to take the time to answer all of the questions and in other instances they appear to be unwilling to provide the quantity of personal information requested. Experience also shows that many of these customers would be willing to provide all of the requested information eventually if given sufficient incentive to do so and if a certain level of trust has been established or value has been provided.

SUMMARY

In accordance with the teachings of the present disclosure, disadvantages and problems associated with existing marketing information systems and methods have been reduced.

According to one aspect of the invention, a computer implemented method provides customized pricing information based on limited personal data. The method comprises receiving non-identifying demographic information about a prospective customer; receiving non-identifying location information about the prospective customer; receiving non-identifying information about a property of the prospective customer; automatically identifying a comparable segment of existing customers based on the non-identifying demographic information, the non-identifying location information, and the non-identifying information about the property of the prospective customer; automatically determining representative pricing information based on prices paid by existing customers in the comparable segment of existing customers; and generating displayable content comprising the representative pricing information.

According to another aspect of the invention, a computer implemented method provides customized product information based on limited prospective customer personal data. The method comprises receiving non-identifying demographic information about a prospective customer; receiving non-identifying location information about the prospective customer; receiving non-identifying information about the property of the prospective customer; automatically identifying a comparable segment of existing customers based on the non-identifying demographic information, the non-identifying location information, and the non-identifying information about property of the prospective customer; automatically determining representative product selection information based on products purchased by existing customers in the comparable segment of existing customers; and generating displayable content comprising the representative product selection information.

According to another aspect of the invention, a computer implemented method provides customized product information based on limited prospective customer personal data. The method comprises receiving non-identifying demographic information about a prospective customer; receiving non-identifying financial information about a prospective customer; automatically identifying a comparable segment of existing customers based on the non-identifying demographic information, and the non-identifying financial information about the prospective customer; automatically determining representative product selection information based on products purchased by existing customers in the comparable segment of existing customers; and generating displayable content comprising the representative product selection information.

According to another aspect of the invention, a computer system provides peer group insurance policy information relative to a prospective insurance customer based on a subset of prospective insurance customer policy criteria to promote disclosure of complete prospective insurance customer policy criteria. The computer system comprises a computer memory comprising a database of existing insurance policy information; a computer clustering module of customer segmentations of the existing insurance policy information in the computer memory; a computer scoring and premium estimation model; a real-time function execution module; and a user interface device. In this system, a subset of prospective insurance customer policy criteria is communicated through the user interface device to the real-time function execution module. Also in this system, the computer scoring and premium estimation model uses the subset of prospective insurance customer policy criteria and the customer segmentations of the existing insurance policy information in the computer memory to determine peer group policy information. Further in this system, the peer group policy information is communicated from the real-time function execution module through the user interface device. Also in this system, the peer group policy information promotes disclosure of complete prospective insurance customer policy criteria for obtaining an insurance policy price amount.

According to yet another aspect of the invention, a process provides peer group insurance policy information relative to a prospective insurance customer based on a subset of prospective insurance customer policy criteria to promote disclosure of complete prospective insurance customer policy criteria. The process comprises segmenting existing customer insurance policy information in a computer memory via a computer segmentation module of a computer system; communicating a subset of prospective insurance customer policy criteria through a user interface device to a real-time function execution module of a computer system; using the subset of prospective insurance customer policy criteria and the customer segmentations of the existing customer insurance policy information in the computer memory to determine peer group policy information; communicating the peer group policy information from the real-time function execution module through the user interface device; and promoting disclosure of complete prospective insurance customer policy criteria via the peer group policy information, wherein the complete prospective insurance customer policy criteria is useable to obtain an insurance policy price amount.

According to another embodiment of the present invention, a computer system provides peer group insurance policy information relative to a prospective insurance customer based on a subset of prospective insurance customer policy criteria to promote disclosure of complete prospective insurance customer policy criteria. The computer system comprises a computer memory comprising a database of existing insurance policy information; a computer segmentation module configured to generate two or more segments of the existing insurance policy information in the computer memory and configured to determine representative information about the existing policy information associated with each segment, wherein each existing insurance policy is associated with exactly one segment; a real-time function execution module in communication with the computer segmentation module and the computer memory, wherein the real-time function execution module is configured to select a target segment based on a subset of prospective insurance customer policy criteria; and a user interface device. The user interface device is configured to transmit the subset of prospective insurance customer policy criteria to the real-time function, and receive for display representative information associated with the target segment selected by the real-time function.

According to a further embodiment of the present invention, a process provides peer group insurance policy information relative to a prospective insurance customer based on a subset of prospective insurance customer policy criteria to promote disclosure of complete prospective insurance customer policy criteria. The process comprises segmenting existing customer insurance policy information in a computer memory by a segmentation module of a computer system to produce a set of segments of existing customer policy information; communicating a subset of prospective insurance customer policy criteria through a user interface device to a real-time function execution module of a computer system; using the subset of prospective insurance customer policy criteria and the set of segments of existing customer policy information to determine peer group policy information; communicating the peer group policy information from the real-time function execution module through the user interface device; and promoting disclosure of complete prospective insurance customer policy criteria via the peer group policy information, wherein the complete prospective insurance customer policy criteria is useable to obtain an insurance policy price amount.

According to another embodiment of the present invention, a data structure is provided in a tangible computer-readable medium. The data structure comprises two or more prospective customer profile records; two or more comparable segment records; and an association between each of the two or more prospective customer profile records and one of the two or more comparable segment records.

BRIEF DESCRIPTION OF THE DRAWINGS

A more complete understanding of the present embodiments may be acquired by referring to the following description taken in conjunction with the accompanying drawings, in which like reference numbers indicate like features, and wherein:

FIG. 1 illustrates a prior art computer interface for gathering long-form information from a prospective customer.

FIG. 5 illustrates a computer interface for gathering limited information from a prospective customer for providing customized pricing and product information, according to certain embodiments of the present disclosure.

FIGS. 6A and 6B illustrate computer interfaces for displaying customized pricing and product information, according to certain embodiments of the present disclosure.

FIG. 9 illustrates a process flow for developing customer segmentation models, according to certain embodiments of the present disclosure.

FIG. 10 illustrates a portion of an example segmentation model, according to certain embodiments of the present disclosure.

FIG. 11 illustrates a data model, according to certain embodiments of the present disclosure.

DETAILED DESCRIPTION

Figure 2:
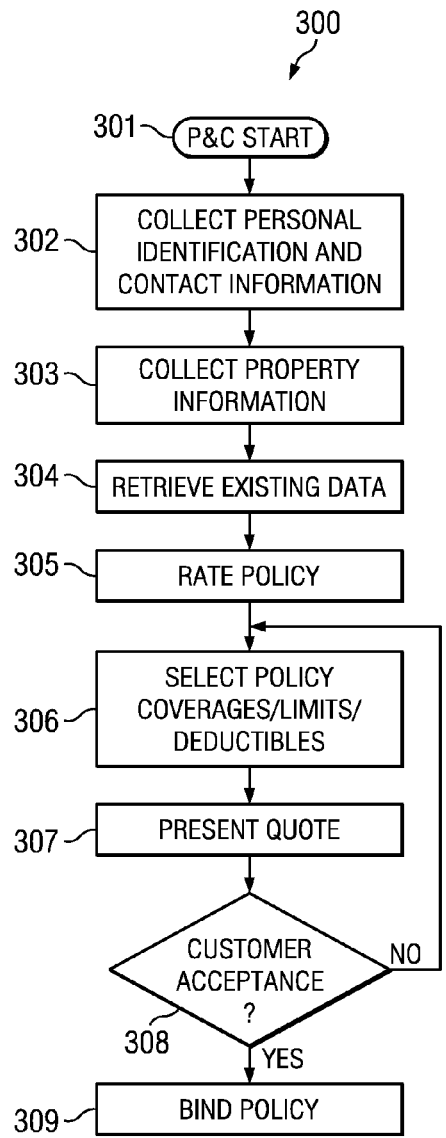
FIG. 2 illustrates a prior art process flow for quoting property and casualty products and services.

Preferred embodiments are best understood by reference to FIGS. 1-10 below in view of the following general discussion.

In the following disclosure, the term "prospective customer" means any individual or entity that may be offered a product or service by a business entity. A prospective customer may be a new, former, or current customer of that business entity. A prospective customer may be an individual or a representative of a prospective business customer. The term "business entity" may include an insurance carrier, a financial services business entity, an independent sales agency, a non-profit or governmental entity for pooling risk, or any other entity offering products or services to prospective customers.

Some aspects of the invention provide prospective customers preliminary information about products or services based on minimal information provided by the prospective customer. For example, in an automobile insurance context, some aspects of the invention provide to the prospective customer factual pricing information (average price paid, minimum amount paid, amount most customers paid under, most commonly selected coverages, limits and deductibles, savings over major competitors), by receiving from the prospective customer answers to only a few questions, such as: age, zip and type of vehicle.

An entire application processes (long-form), whether online or otherwise, for quoting product or service characteristics such as price requires prospective customers to provide significant personal information. For example, current methods of providing online auto pricing information (estimate or quote) require the prospective customer to enter a significant amount of personal information, so the rating engine can calculate a price quote. Characteristics of this approach include: (1) generic customer treatment; (2) standard interaction with the business entity regardless of the prospective customer's risk or behavior profile; and (3) full pricing model (rating engine) applied with a long interaction path. The result of this difficult and impersonal serial transaction is that many customers do not complete the process, and never receive any information about the product or service. Rather than ask prospective customers a multitude of questions about themselves and their situation so as to calculate a well founded quote for a product or service, which may naturally drive up expectations about the individual accuracy of their quick-quote compared to an eventual full-quote, embodiments of the invention simply report to prospective customers during the application process factual information about prospective customers' "peers"—or those existing customers who have recently completed the entire application process and purchased products or services from the business entity, so as to encourage prospective customers to continue with the application process until completed.

Aspects of the invention may: (1) leverage a business entity's in-house customer base to reduce the amount of self-reported information needed to generate an average price for a product or service; (2) utilize pricing experience from existing customers (recent new business pricing) to return what peer customers pay on average for the business entity's products or services; (3) leverage comparative pricing data to show potential savings over business entity's competitors for a similar product or service; and (4) confirm that returned average prices motivate prospective customers to continue with the quoting process.

According to one embodiment of the present invention, a prospective customer is presented with an opportunity to get a quick estimate for insurance based on a relatively limited set of information, which is not capable of identifying the prospective customer. This estimator may utilize a predictive model to estimate the likely premium the prospect would pay to purchase the quoted product. Because the output of the predictive model is merely an estimate, the prospective customer will need to complete a long-form application prior to receiving an actual quote and prior to purchasing a policy.

According to another embodiment of the present invention, a prospective customer is presented with an opportunity to get information about peer customers, which may be indicative of what the prospective customer is likely to pay, based on a relatively limited set of information. In these embodiments, the system identifies a segment of existing customers that resemble the prospective customer and reports information gathered from those peer customers. The reported information provides the prospective customer with an idea of how much a policy may cost before initiating the long-form application process.

These peer customers have recently completed the entire long-form application process and purchased from the business entity. For example, in an automobile insurance context, "peers" may be recent business entity policy holders, which have a similar age, similar car, and similar location as the prospective customer. In some embodiments, the peer group is limited to new policies only—thus excluding renewal business or modified policies. Renewal business and modified policies may be excluded because the rating criteria for renewed and modified policies may be substantially different than the criteria used for new business. In some embodiments, a peer group model may be generated comprising existing policies to which new vehicles were added (not replaced) in the previous six months. This peer group model could be used to provide peer group information for existing customers seeking to add a new vehicle to an existing policy. This and other peer group models could be used within the general scope of the present invention.

To provide the factual information about a prospective customer's "peers," inputs may include age group, a car year-make-model, and a ZIP code where the car is garaged.

Factual information provided to the prospective customer may include:
 (a) what the prospective customers "peers" paid for the product or service;
 (b) how that amount compares to what their "peers" would have paid at the business entity's competitors;
 (c) what the most prevalent product or service configurations or characteristics (insurance coverage limitations, for example) were for the prospective customer's peer group;
 (d) what the most prevalent coverage limit choices were for the prospective customer's peer group; and
 (e) what the most prevalent deductible choices were for the prospective customer's peer group.

Various embodiments of the invention may be implemented in a variety of applications. For example, smart phone applications written for IOS™ or ANDROID™ platforms, where entering a lot of information by the consumer might prove prohibitive to completing a long-form application for an accurate full-quote. Consumers are likely interested in learning what their peers are paying for insurance and what they are saving by choosing the business entity. This information may lead a prospective customer to select a "call now for quote" icon, which would dial the smart phone automatically to reach a business entity's representative to obtain a full and binding quote. Another example is an embedded/referenced process in web ads used to generate interest, which link to either a call center (by providing a phone number) or a hot transfer to the business entity's website, in order to complete a full-quote process. A further example is a standalone web application, for users of notebook devices, like the IPAD™, where customers are more likely to have limited keyboarding patience due to the lack of a traditional keyboard device. Still another example is a standalone web application for a business entity's agents or staff to provide assistance when a price "order of magnitude" is quickly needed for a particular peer group.

In one embodiment of the invention, a business entity's internal comparative rating studies may be used as a source of data for a peer customer reporting tool. Comparative rating studies may analyze how premiums in the business entity's current book of business compare with that of top competitors. The peer customer reporting tool may use the peer customer data to cite summary statistics about recent converts to the business entity.

In an insurance context, database fields for a peer group may include the following types of fields:

(1) age group, car group, territory group—together, unique combinations of these fields may define the peer groups;

(2) average (mean) 6 month premium for a particular peer group based on their individual coverage/limit/deductible choices;

(3) average (mean) 6 month premium for each of several competitors of this peer group, based on the same individual coverage/limit/deductible choices they made at the business entity;

(4) the $24.5^{th}$ and $75.5^{th}$ percentiles of premium for each peer group;

(5) for bodily injury (BI) upper limit, BI lower limit, property damage (PD) limit, Medical Payment limit, personal injury protection (PIP) limit, Collision Deductible, Comprehensive Deductible, uninsured motorist (UM) BI upper limit, UM BI lower limit, UM PD limit, underinsured motorist (UIM) BI upper limit, UIM BI lower limit, and UIM PD limit, the following information: percent of the peer group electing coverage, the most prevalent overall choice of coverage (might be "no coverage"), the most prevalent choice of coverage for peer group members actually electing coverage, and the relative percent of the most prevalent non-missing coverage choice among all non-missing coverage choices available.

EXAMPLE

In an automobile insurance context, peer groupings and associated data may be developed as follows:

A. Peer groupings may be based on combinations of three different customer attributes that relate to important factors used in rate calculations including the age of the principal driver (grouped in representative bands), the vehicle type (grouped in representative bands), and the territory (grouped in representative bands).

B. The breaks may be chosen in a present data set based on differences in average rating factors across the groups, as well as to preserving a reasonable number of peers in each variable grouping.

C. To determine the average premiums reported for any of the enumerated peer groupings:
  (1) For each raw new policy in the peer grouping do the following:
    (a) Determine the major coverages, limits, and deductibles on their current policy with the business entity.
    (b) For the business entity and each of its major competitors, calculate the estimated premium for this policy based on the officially filed rating plans of each company.
  (2) For the business entity and each of its major competitors, sum the respective premiums for all policies in the peer grouping, and divide each sum by the total number of policies within the peer group.

D. To determine the percentile X of the business entity's premium distribution for any of the peer groupings:
  (1) Sort all policies in the peer group from lowest to highest according to business entity premium.
  (2) Go X percent of the way into the list.
    (a) If this falls exactly on a policy, then report that policy's premium as the Xth percentile.
    (b) If this falls between neighboring policies M and N, then use linear interpolation to find the appropriate approximation for the Xth percentile, which will necessarily fall between policy M's premium and policy N's premium.

E. The $24.5^{th}$ and the $75.5^{th}$ percentiles may be chosen to facilitate messaging that describes a middle range of premium values that embody "most" (e.g., 51% of) peer customers. The $75.5^{th}$ percentile value can be similarly used if messaging is to provide some kind of reasonable upper bound, such as "over 75% of Customers Like You™ who have recently purchased from this business entity paid less than $X."

F. Elected coverages, and most prevalent limits and deductibles:
  (1) Percent with coverage—indicates the percentage of all policies in the peer group that elected the coverage in question.
  (2) Overall Modal Value—this is the most prevalent overall choice of limit or deductible for this coverage by all policies in the peer group. It may be "no coverage."
  (3) Non-missing Modal Value—this is the most prevalent limit or deductible choice for policies in the peer group that elected coverage.
  (4) Percent of Non-Modal missing Value—of policies in the peer group who elected coverage, indicates the percent who chose the Non-missing Modal Value.

G. Example for Item F (Elected coverages, and most prevalent limits and deductibles).
  (1) Assume that peer group A has underlying data for Comprehensive Coverage as follows:
    (a) 1000 total policies in peer group A.
    (b) 400 policies decline Comprehensive Coverage.
    (c) 600 policies elect Comprehensive Coverage.
    (d) 200 policies choose a $100 deductible.
    (e) 100 policies choose a $250 deductible.
    (f) 300 policies choose a $500 deductible.
  (2) The Percent With Coverage is calculated as 60% (600/1000).
  (3) The Overall Modal Value is "no coverage" in this example because the most prevalent overall category of Comprehensive Coverage is "no coverage." Note that "no coverage" is 40% (400/1000); $500 deductible is 30% (300/1000); $100 deductible is 20% (200/1000), and $250 deductible is 10% (100/1000).
  (4) The Non-missing Modal Value is a $500 deductible because it is the most prevalent deductible choice after excluding those without coverage. Note that after excluding no coverage, $500 deductible is 50% (300/600); $100 deductible is 33.3% (200/600), and $250 deductible is 16.7% (100/600).
  (5) The Percent of Non-Modal missing Value is 50% (300/600).

Calculations and messaging may be derived from the peer group data. For any given peer group, a variety of calculated fields might prove useful to report to prospective customers, depending on circumstances. For example, one calculation may be to determine the largest competitor average premium difference from the business entity for a given peer group. A message to a prospective customer could state, "Customers Like You™ who buy from the business entity pay an average of $X, which represents a savings of $Y over competitor ABC." Further, to accentuate differences the business entity premium could be quoted as a monthly figure by dividing by 6; the savings could be stated as an annual amount by taking the largest 6 month premium difference and multiplying by 2. If a particular competitor is to be targeted, the calculations and messaging could use that particular competitor rather than the one with the largest premium difference in favor of the business entity whenever possible (premium difference is positive in favor of the business entity).

Another calculation may be to determine the range of what most peer customers pay by citing the 24.5$^{th}$ and 75.5$^{th}$ percentiles as the bounds of the range. It should be noted that this range contains the center 51% of the peer group premiums. A message to a prospective customer could be: "most Customers Like You™ pay between $X and $Y." Another message reporting the 75.5$^{th}$ percentile could be: "more than 75% of Customers Like You™ who bought from the business entity paid less than $X."

Messaging from the coverage data could include information such as: "Customers Like You™ typically choose the following coverages: _____, _____, etc." For situations when most peer customers do not elect a particular coverage, additional language could be inserted such as: "when Customers Like You™ do choose (insert a particular type of coverage), they most often elect an $X deductible."

According to one aspect of the invention, one may consider how close the peer group averages are to what individuals actually pay in that peer group. For example, for a majority of consumers who end up purchasing auto insurance from a property and casualty insurer ("InsCo"), the group average reported in a peer group reporting tool may be within about $25 per month of the actual amount they pay. The "closeness" of the reported averages to what individuals in a peer group actually pay may be a function of the natural variance in coverage/limit/deductible choices. In this way, peer group summary statistics may provide an important baseline reference to which the consumer can reasonably relate—information about recent converts to the business entity who have similar age, territory, and vehicle.

DETAILED DESCRIPTION OF FIGURES

Figure 4:
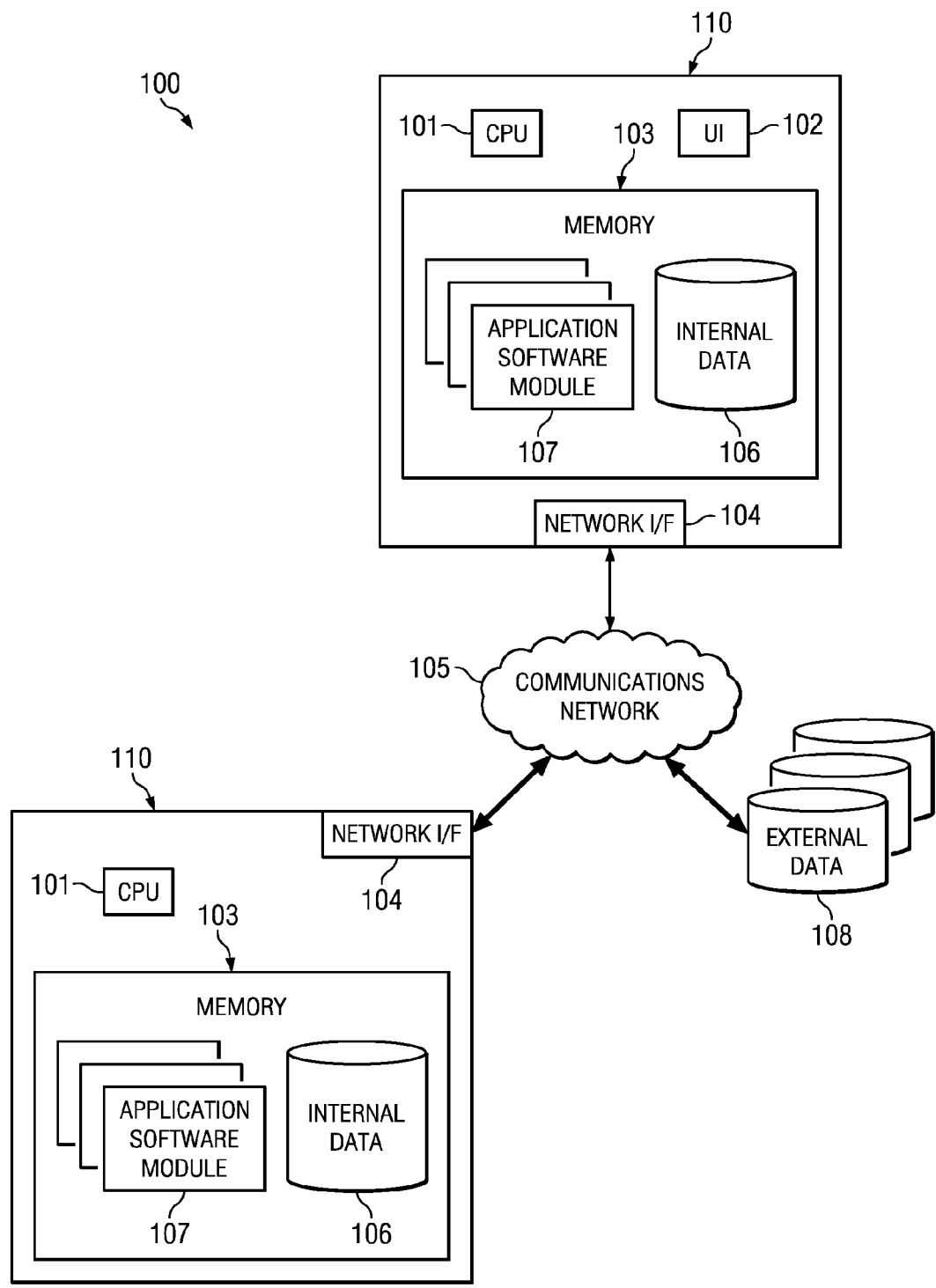
FIG. 4 illustrates a computing system, according to certain embodiments of the present invention.

FIG. 4 illustrates a computing and information handling system according to certain embodiments of the present invention. System 100 comprises one or more computers 110. Each computer 110 may comprise a central processing unit (CPU) 101, a user interface 102, a memory 103, and a network interface 104. The memory 103 comprises one or more internal data stores 106 and one or more application software modules 107. System 100 further comprises a communications network 105 and external data stores 108.

Computer 110 may be any type of general purpose or specialized computer system. In some embodiments computer 110 may be a personal computer (e.g., an X86-based computer) running a operating system such as UNIX™, OSX™, or WINDOWS™. In some embodiments computer 110 may be a server or workgroup class system such as those offered by IBM™, HP™, COMPAQ™, or ORACLE™. In other embodiments, computer 110 may be a mainframe system such as an IBM ZSERIES™ mainframe. System 100 may comprise a heterogeneous or homogeneous network of computers 110. In some embodiments, computer 110 may be a mobile device such as a laptop, tablet PC, or smart phone.

CPU 101 may be any general purpose processor including ARM™, X86, RISC, and Z10™. Memory 103 may be any form or combination of volatile and/or non-volatile tangible computer-readable medium including semiconductor memory (e.g., RAM, ROM, flash, EEPROM, and MRAM), magnetic memory (e.g., magnetic hard drives, floppies, and removable drive cartridges), optical memory (e.g., CD-ROM, DVD-ROM, BLURAY™ ROM, and holographic storage), as well as other storage technologies. Memory 103 provides transient and/or persistent storage of internal data 106 and application software modules 107. Memory 103 also provides storage for operating system software including device drivers and system configurations. Network interface 104 provides data interconnection—via communications network 105—between computers 110 and external data stores 108.

User interface (UI) 102 may include software and/or hardware for presenting information to a prospective customer or agent and accepting input in response. UI 102 may be a graphical display with an associated input device such as a touch screen, light pen, keyboard, mouse, trackpad, digital camera, microphone, joystick, rollerball, scanner, and/or GPS receiver. UI 102 may be a smart phone interface, for example, an IOS™, BLACKBERRY™, ANDROID™, or WINDOWS™ application. UI 102 may be a web interface.

Internal data 106 may comprise data specific to a potential or existing customer as well as data applicable to a set of potential or existing customers. Internal data 106 may include text, graphics, video, or other multimedia that may be presented to a user through UI 102. Internal data 106 may be arranged in a relational database, e.g., IBM DB2™. More specific examples of internal data 106 are provided below with reference to specific capabilities and functions of the present disclosure. Internal data 106 may include a database of information about existing customers. This existing customers database may include, for example, demographic classification of each customer, information identifying each customer, information identifying the property and/or financial information about each customer, information characterizing the claims risk of each customer, and information identifying each product purchased and pricing information for each product. Internal data 106 may include a database of information relating to historical interactions with the business entity including, for example, prior quotation and purchase history, claims history, and/or payment history.

Application software modules 107 comprise software or firmware instructions and configuration information that provides instructions to CPU 101 to perform the steps of the methods, procedures, and functions disclosed herein. Application software may be implemented in a compiled and/or interpreted environment. In some embodiments, Application Software modules may be implemented in a high-level programming language such as COBOL, FORTRAN, C, C++, SmallTalk, JAVA™, C#, assembly language, JAVA™ server pages (JSP), application server pages (ASP), VISUAL BASIC™, RUBY™, or OBJECTIVE C™. Application software modules 107 may include segmentation modeling software for grouping like data according to certain data similarities. Application software modules 107 may include predictive modeling software for developing a predictive model to estimate the likely product interests of a prospective customer and/or to estimate the price to be paid by a prospective customer for a particular product. Application software modules 107 may include a real-time function execution module. The real-time function execution module may be configured to accept information from UI 102 (e.g., via communications network 105) and configured to generate responsive information in a real-time or near real-time manner, e.g., responsive to user interactions.

Communications network 105 may be a heterogeneous or homogenous set of physical mediums (e.g., optical fiber, radio links, and copper wires) and protocol stacks (e.g., ETHERNET™, FDDI, GSM, WIMAX™, LTE, USB™, BLUETOOTH™, FIOS™, 802.11, and TCP/IP.

External data 108 may be any form of data source. In some embodiments, external data 108 is received on an optical disk and imported into an internal data store for further processing. In some embodiments, external data 108 is an external data store hosted on a computer accessible via communications network 105. External data 108 may be available for on demand retrieval or may be pushed by a data provider. External data 108 may be transferred to computer 110 in whole or in part. This transfer may be, for example, periodic, on demand, or as changes occur.

FIG. 5 illustrates a computer user interface ("UI") for gathering limited information from a prospective customer for providing customized pricing and product information, according to certain embodiments of the present invention for a property and casualty insurer ("InsCo"). Short form 500 includes, for example, four sections. First, personal information 510 includes personal, but not personally identifiable, information such as age and gender. While personal information 510 may include a date of birth, experience has shown that prospective customers are most comfortable sharing their age. Next, vehicle information 520 includes a limited number of questions about the prospective customer's vehicle that most drivers will know without having to reference documentation or the vehicle itself. The vehicle information collected may include a make (e.g., brand), style, and model year.

Next, general information 530 may include a few questions to which most prospective customers will know the answer and be willing to answer. These questions likely have an impact on underwriting or major discount programs. For example, general information 530 may include a question about recent accidents, citations, or claims to determine whether standard rates are likely to apply. General information 530 may include a question about installed and/or monitored systems for preventing or discouraging certain perils or for mitigating the impact of a particular peril. For example, for an automobile policy, an installed alarm or vehicle tracking system may trigger a significant discount for comprehensive coverage. Likewise, a monitored fire alarm or automatic fire suppression system in a residence may trigger a significant discount for fire insurance, for a residential or business property policy. In another example, general information 530 may include questions about whether the prospective customer plans to insure more than just the vehicle or property described in vehicle information 520. Many insurance carriers offer a discount if multiple vehicles are insured on the same policy or a vehicle and a home are insured for the same customer. General information 530 may be input into a predictive model to help revise the estimate premium.

In some embodiments, especially where no predicive model is used, general information 530 may be omitted to further simplify the user input process.

Finally, short form 500 includes some amount of location information 540, e.g., a ZIP code. In some embodiments, location information 540 may be derived from a prospective customer's Internet connection information, from wireless radio tower triangulation data, or satellite-derived location data (e.g., from the Global Positioning System (GPS)). In some embodiments, location information 540 may include an option to use the current location of the user's hand-held device. Once short form 500 has been completed, a prospective customer may submit the information and immediately receive relevant pricing information shown in the next figure.

FIG. 6A illustrates a computer user interface for displaying customized pricing and product information, according to certain embodiments of the present invention. Interface 600 prominently displays an estimated premium figure of $338.69 in premium field 610. This estimated premium may be obtained using a predictive model designed to estimate the likely premium based on all available data. Comparative quotation 615 may provide information about pricing by one or more competitors or a group of competitors. In some embodiments, comparative quotation 615 may indicate the price—or range of prices—one or more competitors may charge a peer customer. In some embodiments, comparative quotation 615 may indicate the likely difference in premium charged by InsCo and one or more competitors based on the information known about the prospective customer and/or the peer segment. In certain embodiments, comparative quotation 615 may indicate the actual savings of peer customers that switched from a particular insurance company to InsCo. Comparative quotation 615 may provide more extensive competitive pricing information to an insurance agent than to a prospective customer.

Typical coverage levels 620 include an enumeration of possible coverages, limits, and deductibles relevant to one or more products of interest to the prospective customer. Each item in the enumeration may have an indication such as checkmark 621 to indicate whether customers in the same segment selected that option (though some coverages, limits, and deductibles may not be optional in certain jurisdictions). For variable coverages, limits, or deductibles, an indication such as notice 622 may indicate the most common level selected by customers in the same segment as the prospective customer. In some embodiments, notice 622 may be a hyperlink to the computer interface illustrated in FIG. 7.

In some embodiments, coverage levels 620 may be shown with associated premium contribution amounts (or ranges indicating a maximum/minimum premium contribution amount). In one example, a young driver with a new sports car may be shown a list of coverage levels 620 with the comprehensive and collision coverages grayed out and marked "not chosen by Customers Like You™." This message indicates that the most similar segment of customers to the young driver did not purchase these coverages. One likely reason for this collective behavior may be the high price of those coverages for young drivers with little driving history and expensive, sporty cars. In one example, the coverage level for Collision Coverage may have an additional associated message indicating a range of premium contribution for the maximum and minimum deductible offered, or a message such as "selecting this coverage may increase your six month premium by $512 to $831." Such a message may be helpful in triggering up-sell behavior for less expensive coverages such as rental reimbursement and emergency roadside service coverage. This type of message may also be helpful in guiding a prospective customer towards more affordable coverage levels, or more appropriate coverages. This premium contribution message may indicate the range of premium contribution in relative terms if a specific coverage is currently selected. For example, if Collision Coverage is already selected with a low deductible, the message may indicate the possibility of lowering the premium estimate by raising the deductible.

Other products 630 may list additional products commonly purchased by customers in the same segment as the prospective customer. As with typical coverage levels 620, other products 630 may include an enumeration of products 631 and may include notices of levels 632 selected by other customers in the same segment as the prospective customer.

Recalculate 641 may allow the prospective customer to commit their selections/deselections and rerun the models to perform a "what-if" analysis. After entering additional information or customizing the available options, the estimate may be updated to remain relevant. Finally, next step options 640 may allow the prospective customer to complete the purchase process online or with an agent.

FIG. 6B illustrates a computer user interface for displaying customized pricing and product information, according to certain embodiments of the present invention. Interface 650 prominently displays information about peer customers in premium field 610. This information may include various statistics drawn from information known about a particular segment of existing new customers. For example, premium field 610 may state that, on average, peer customers paid on average a particular premium. Alternatively, statements may be made indicating that more than 75% of peer customers paid less than a certain amount or that more than 51% of peer customers paid between a particular floor and ceiling amount. In some embodiments, comparative quotation field 615 may also include statements about savings actually realized by peer customers who switched to InsCo from another carrier or from a specific carrier. In certain embodiments, comparative quotation field 615 may also include an estimated premium from one or more competing carriers, which may be based on published rates or legally available information retrieved in the background from a websites, etc.

Interface 650 may also include coverage levels 620, but may not have the option to modify coverage levels or to recalculate the estimate. Whereas interface 600 had data populated by a prediction engine, which could be re-executed with additional data, interface 650 has data populated by static data representing a particular segment of existing new customers. In some embodiments, a hybrid approach may be possible if the rating methodology allows. In this hybrid approach, modifications to coverage levels may trigger premium additions or deductions that can be applied to the average premium of peer customers.

Figure 7:
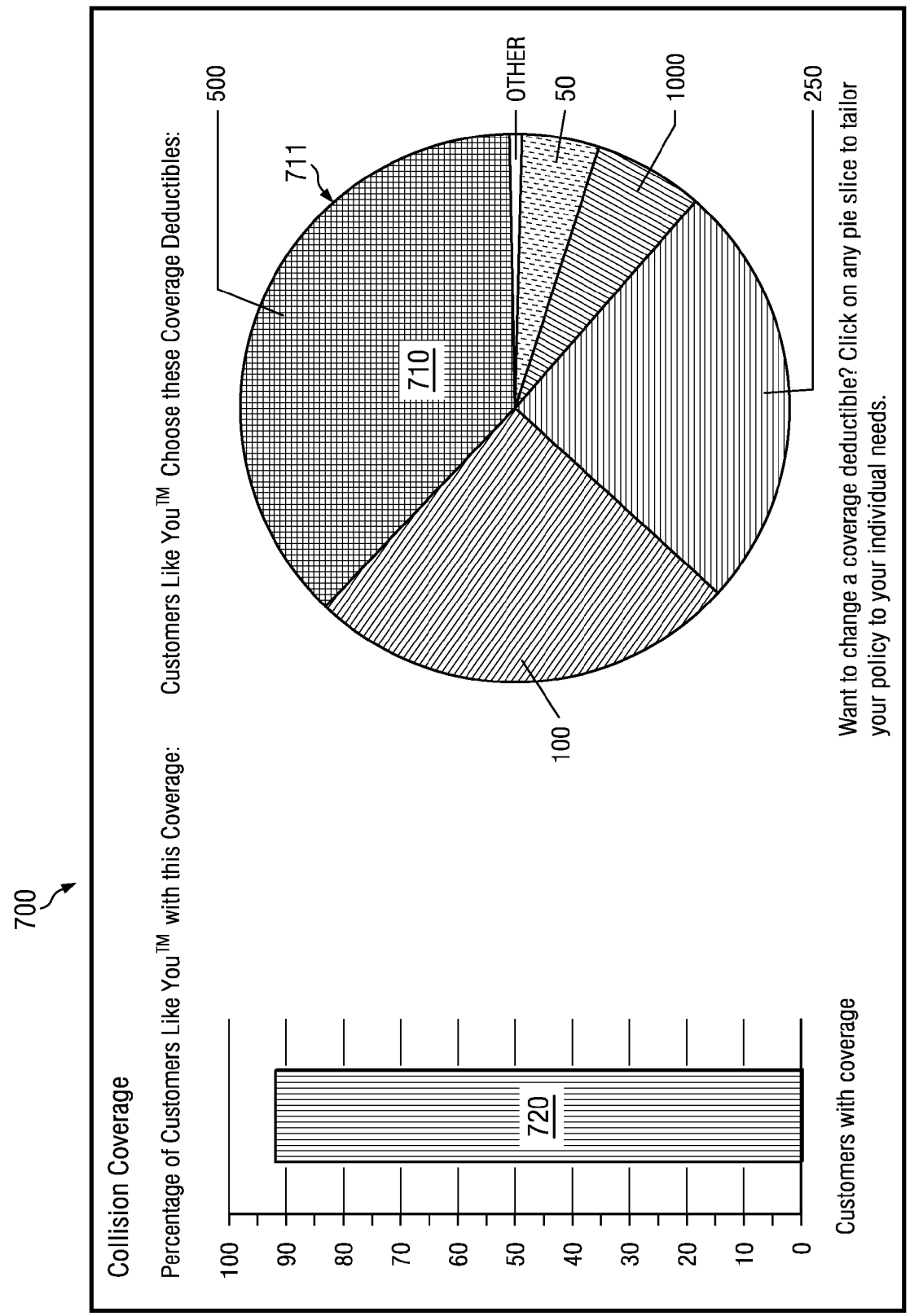
FIG. 7 illustrates a computer interface for displaying additional customized product information, according to certain embodiments of the present disclosure.

FIG. 7 illustrates a computer user interface for displaying additional customized product information, according to certain embodiments of the present invention. Computer user interface 700 may include chart 710 illustrating the relative proportion of customers in the same segment as the prospective customer who have selected a given level of a coverage, limit, or deductible. Here, the range of possible deductible amounts (e.g., for comprehensive coverage for an automobile policy) may be from $50 to $1000. Viewing chart 710, roughly a quarter of customers in the current segment selected a deductible of $250, while nearly forty percent selected a deductible of $500. In some embodiments, a prospective customer could select a particular region 711 of chart 710 to select the corresponding level. Chart 720 illustrates the overall percentage of customers in the segment with some level selected.

Computer user interface 700 may be embedded in, or visually linked to, computer interface 600. In some embodiments, selecting region 711 may result in an automatic update of the returned premium amount on computer interface 600.

Figure 8A:
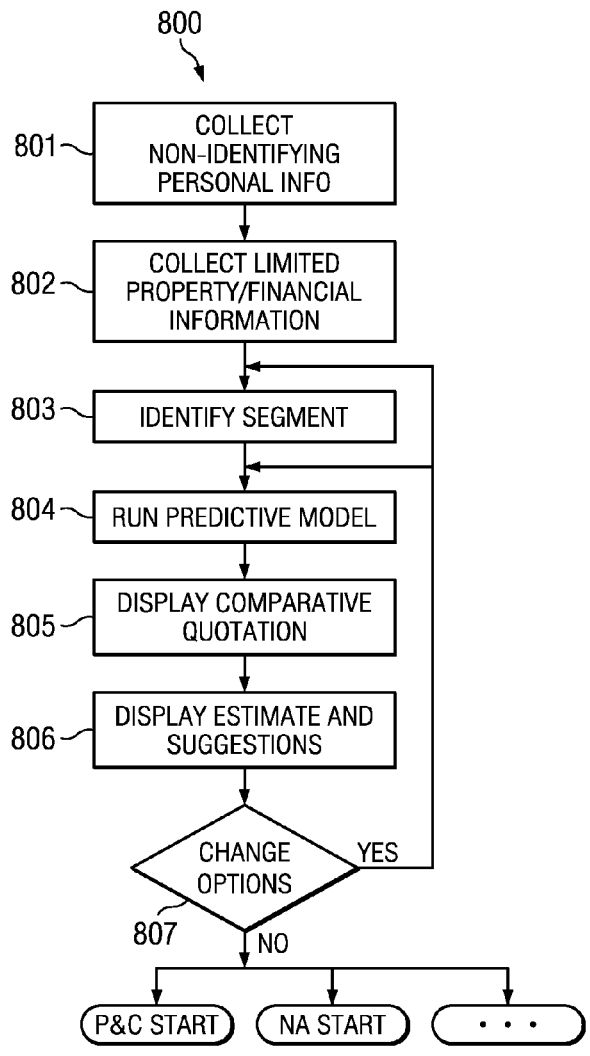
FIGS. 8A and 8B illustrate process flows for providing customized pricing and product information, according to certain embodiments of the present disclosure.

FIG. 8A illustrates a process flow for providing customized pricing and product information, according to certain embodiments of the present invention. Process flow 800 begins by collecting non-identifying personal information at step 801, which may correspond to personal information 510 and location information 540. This non-identifying personal information may include age and gender. The process flow may continue by collecting limited property/financial information at step 802, which may correspond to vehicle information 520. This limited property/financial information may include readily recallable information such as the brand of vehicle, style, and model year. In some embodiments, one or both of collection steps 801 and 802 may be invisible to the prospective customer. For example, if InsCo were to partner with an automobile manufacturer, information about automobile sales and loan information may be shared at the time an automobile is purchased or as part of a direct marketing campaign. In another example, a user of an automotive affinity website may have entered the information required by steps 801 and 802 as part of his/her personal profile. As the user navigates the website looking for relevant information on servicing or upgrading his/her vehicle, a targeted web advertisement module may feed this information into process flow 800. In a further example, an internet user's profile may be inferred from a history of web interaction. One or more data elements required by steps 801 and 802 may be input into process 800 based on an inference. This inferential data may be marked as uncertain or inferred to allow a prospective customer to correct any inaccuracy.

In some embodiments, limited property/financial information collected at 802 may include non-identifiable financial information about the prospective customer. For example, questions may include the prospective customer's approximate income, investment and savings assets, debt and other liabilities, insurance contracts, and retirement savings. This information may be relevant to the appropriateness of certain financial services products. As with the above example, some of this information may be derived from existing data sources or inferred from profile or contact information.

The process flow may then continue by identifying a segment of existing customers (at step 803) that may be similar to the current prospective customer. In certain embodiments, this segment identification may be determined based solely on the information collected in steps 801 and 802. In some embodiments, additional information may be used in the segment identification process such as example general information 530 or any additional personal or property information known to the system. With a segment identified, the process flow may continue (at step 804) to execute a predictive model to estimate the premium needed to cover the prospective customer for a specific insurance product (e.g., auto insurance) or may estimate the fees and/or return expected from other financial services products. The predictive model may also determine which products and/or options are likely to be relevant to the prospective customer.

The process flow may then continue by determining pricing information for competitors' products (at step 805). In some embodiments, competitors' pricing information may be determined from public insurance filings made by competitors with regulatory agencies. In some embodiments, competitors' pricing information may be determined from information provided by peer customers. In certain embodiments, competitors' pricing information may be determined by accessing—in a manner invisible to the prospective customer—quick quote applications provided by a competitor.

The process flow may continue (at step 806) to present an estimate and/or potentially appropriate product menu to the prospective customer (or an agent meeting with the prospective customer). The presentation may be via computer interface 600 or computer interface 650. In some embodiments, the premium estimate may be generated from a premium estimation model (e.g., a predictive model) developed from information about existing customers in the identified segment. In many embodiments, the premium estimate may be accompanied by specific language explaining the significance of the estimate in order to comply with insurance regulations and common law requirements. The prospective customer may be presented with a set of potentially appropriate coverages, limits, deductibles, and/or products, corresponding to typical coverage levels 620 and/or other products 630. To simplify the discussion, this set of potentially appropriate coverages, limits, deductibles, and/or products will be referred to as "products." Products may be selected, deselected, or configured via computer interface 600 or computer interface 650 (at step 807), which may trigger a return to step 803 or 804 as appropriate.

Figure 3:
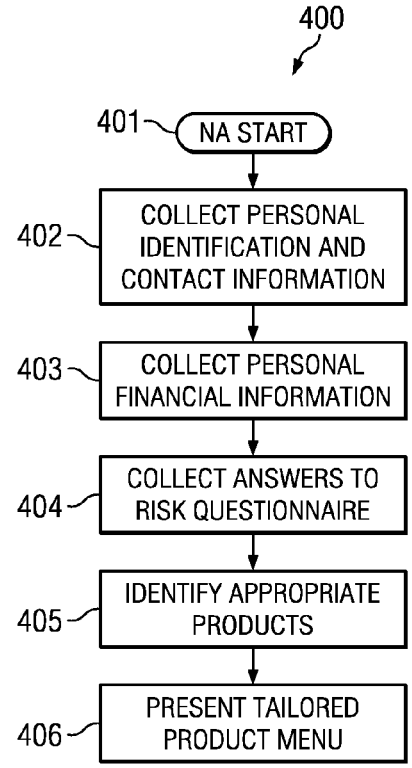
FIG. 3 illustrates a prior art process flow for performing a needs analysis of a prospective customer with respect to life insurance, retirement, and investment products.

If no changes are made at step 807, the prospective customer may then be directed to the long-form insurance quoter or needs analysis processes of FIGS. 2 and 3 for binding quotes and complete needs analysis.

Figure 8B:
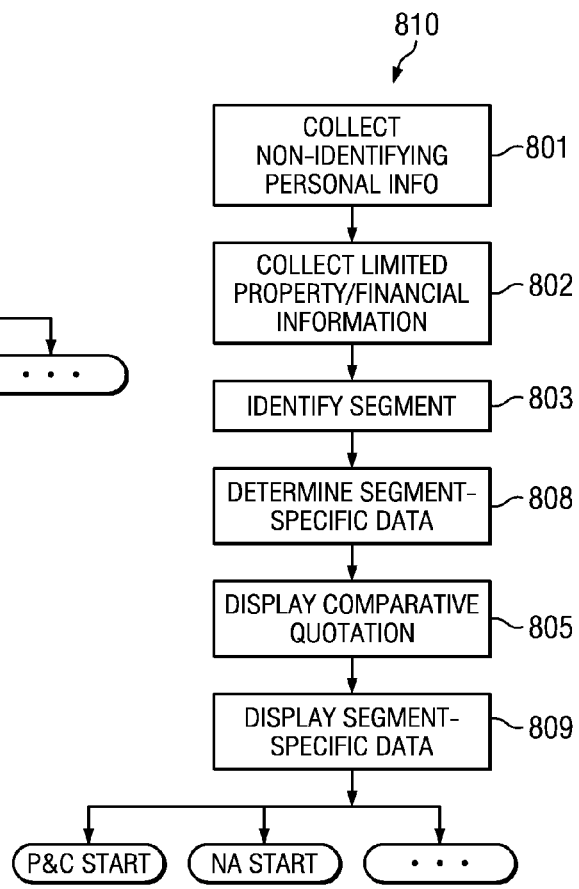

FIG. 8B illustrates a process flow for providing customized pricing and product information, according to certain embodiments of the present invention. Process flow 810 begins by collecting non-identifying personal information at step 801 and limited property and/or financial information at step 802. As with the process flow illustrated in FIG. 8A, one or both of collection steps 801 and 802 may be invisible to the prospective customer. The process continues with the identification of a representative segment at step 803.

In step 808, information is derived directly from the data associated with the representative segment identified in step 803. This information may include statistics derived from the products purchased by new customers to InsCo or FinCo during a preceding period of time. In some embodiments, the segment statistics are recalculated every six months, and step 808 always refers to the most current statistics, which represent new customers from six to twelve months prior to the time the prospective customer accesses the system.

In certain embodiments, an insurance premium amount is provided based on statistics associated with the new customers in the identified segment of peer customers. The premium amount may be calculated as the average or median premium paid by the peer customers. In some embodiments, the premium amount may be presented as a range, e.g, the 24.5th and 75.5th percentile premiums paid by the peer customers.

In step 805, competitive pricing information may be determined to present comparative quotation 615.

In step 809, the prospective customer may be presented with a set of potentially appropriate coverages, limits, deductibles, and/or products, corresponding to typical coverage levels 620 and/or other products 630. The set of products presented to the prospective customer may include products owned by a threshold proportion of customers in the identified segment. In some embodiments, a threshold of 100% may be used for at least some products; a caption for these products may be: "Customers Like You™ purchased the following products." In some embodiments, a lower threshold may be used for at least some products; a caption for these products may be: "The majority of Customers Like You™ purchased the following products."

Once the prospective customer has reviewed the information in step 809, the prospective customer may then be directed to the long-form insurance quoter or needs analysis processes of FIGS. 2 and 3 for binding quotes and complete needs analysis.

FIG. 9 illustrates a process flow for developing customer segmentation models (and predictive models), according to certain embodiments of the present invention. Process flow 900 begins with building a dataset of existing product details 901. This dataset may be based on existing data retained by one or more companies, including insurance carriers, financial services providers, agents, intermediaries, and/or third-party data aggregators. To build a model relevant to property and casualty products, the dataset may include personal information for each insured, property information for each covered property, premiums paid, coverages selected, coverage levels, riders purchased, and selected deductibles. In some embodiments, this data is stored in one or more relational databases and may be normalized. In some embodiments, a subset of the data is held in reserve for testing and validation purposes.

The process continues with building a segmentation model at step 902. In some embodiments, this step may include the use of a statistical modeling tool such as UDB MINER™ or SAS™. In one approach, the segmentation model is developed by selecting a small number of variables in the statistical modeling tool. The modeling tool then analyzes the existing data to generate a set of segments.

In some embodiments, a propensity model is created in conjunction with (or based on) the segmentation model. The propensity model may determine the propensity of a customer or prospective customer to defect from his or her existing insurance or financial services company. This information may be used to tailor customer facing computer interfaces and marketing offers to retain existing customers or encourage prospective customers to defect from their existing providers.

In some embodiments, a premium estimation model is created based on the segmentation model. The premium estimation model may be developed based on months or years of existing premium data.

The process continues with testing the model against existing data at step 903. In some embodiments, the model is tested against existing data held in reserve at step 901. Some number of existing customers in the reserve data set are processed through the model and assigned to segments. The distribution of assignment of these test cases may be compared to the distribution of the initially segmented data as one method of validating the segmentation model.

Next, the test data is used to measure model accuracy at step 904 by comparing, for example, the premium paid by each customer in the test case with the expected value associated with the segment. The expected value may be a predicted value from a premium estimation model or a statistical value generated directly from the existing customers in the segment. If the model accuracy is insufficient, the model may be revised or rebuilt by returning to step 902.

The model must also be validated at step 905. In validating a model, business criteria are applied to the segmentation model to determine whether the model appropriately groups individuals. For example, even if accurate when analyzed against a subset of data, a pool of young, male drivers with expensive sports cars should not generally be rated lower than a group of middle-age drivers of family sedans. Such anomalies may be detected manually or automatically based on a set of business rules.

Once the model has been verified as sufficiently accurate and valid, the model is pushed to production systems at step 906. In some embodiments, this step includes creating a data set of segments associated with selection criteria and statistical features. The model may identify the data to be collected at steps 801 and 802, e.g., age, gender, vehicle make, vehicle body style, vehicle model year, and ZIP code. A segment record may have selection criteria, e.g., males between the ages of 30 and 42 or females between the ages of 26 and 45. The segment record may additionally include statistical information such as the average premium paid, typical coverage levels and premium contribution amounts, and commonly owned financial products.

FIG. 10 illustrates a portion of an example validated segmentation model, according to certain embodiments of the present invention. Graph 1001 illustrates eight segments derived from a data set of auto insurance customers. Axis 1002 represents the total population to be analyzed (e.g., all existing insured customers or all entries in a database of households for which sufficient information is known). Each segment is shown with a segment size (as a percentage of the total population), a segment description, and a segment identifier. As a specific example, segment #2 includes 16% of insured customers and is labeled "some accidents, expensive cars, higher premium." The segment description may be automatically generated. A visualization may be helpful to determine whether the segmentation approach is inappropriately concentrated. For example, several large segments may indicate a need for further or better segmentation. Each segment may be illustrated with one or more charts visualizing values of variables represented by that segment.

FIG. 11 illustrates a data structure, according to certain embodiments of the present disclosure. Data structure 1100 may be stored in a tangible computer-readable media memory 103 or internal data 106. Data structure 1100 comprises prospective customer profile records 1101, comparable segment records 1102, and competitor segment records 1103. Each prospective customer profile record 1101 comprises a set of criteria for mapping information gathered from a prospective customer to a key value 1105, which identifies a specific comparable segment record 1102 and zero or more competitor segment records 1103. In certain embodiments, the mapping criteria includes a range of geographic rating group values, a range of vehicle rating factor values, and a range of age values.

Each comparable segment record 1102 represents a segment of new customers that have purchased a product or service from the business entity in a particular window of time (i.e., a peer group). Each comparable segment record 1102 comprises statistics relating to the actual customers associated with the comparable segment of new customers as well as the products and/or services purchased from the business entity by each actual customer. In some embodiments, comparable segment record 1102 comprises the average (mean) 6-month premium for actual new customers in the comparable segment. In some embodiments, comparable segment record 1102 comprises the $24.5^{th}$ and $75.5^{th}$ percentiles of premium paid by the actual new customers in the comparable segment. In some embodiments, comparable segment record 1102 comprises the distribution statistics for each of the following attributes: bodily injury (BI) upper limit, BI lower limit, property damage (PD) limit, Medical Payment limit, personal injury protection (PIP) limit, Collision Deductible, Comprehensive Deductible, uninsured motorist (UM) BI upper limit, UM BI lower limit, UM PD limit, underinsured motorist (UIM) BI upper limit, UIM BI lower limit, and UIM PD limit. In some embodiments, comparable segment record 1102 comprises the percent of the peer group electing coverage, the most prevalent overall choice of coverage (might be "no coverage"), the most prevalent choice of coverage for peer group members actually electing coverage, and the relative percent of the most prevalent non-missing coverage choice among all non-missing coverage choices available.

Each competitor segment record 1103 represents competitive pricing information regarding a competitor of the business entity. In some embodiments, competitor segment record 1103 comprises the name of a competitor and the average (mean) 6 month premium charged by that competitor. In some embodiments, the competitor's average premium may be based on reported information from new customers in the peer group. In some embodiments, the competitor's average premium may be based on rates filed by that competitor with a regulatory agency in conjunction with information in the comparable segment record 1102 associated with the same key value 1104. For the purposes of this disclosure, the term exemplary means example only. Although the disclosed embodiments are described in detail in the present disclosure, it should be understood that various changes, substitutions and alterations can be made to the embodiments without departing from their spirit and scope.

What is claimed is:

1. A computer system configured to provide peer group insurance policy information relative to a prospective insurance customer based on a subset of prospective insurance customer policy criteria to promote disclosure of complete prospective insurance customer policy criteria, the computer system comprising:
    a computer memory comprising a database of existing insurance policy information, the existing insurance policy information being segmented into multiple customer segments based on insurance policy criteria selected from: an age of an insured, a gender of the insured, a type of property insured, details regarding the property insured, a presence of alarms associated with the property insured, and a number of accidents, citations received by the insured, or claims filed by the insured within a specified timeframe;
    wherein the database stores representative information regarding customer segment comprising at least one statistic relating to: the dollar value of insurance premiums paid by customers in that segment, coverages elected by customers in that segment limits elected by customers in that segment, deductibles elected by customers in that segment, and other products owned by customers in that segment;
    a computer clustering module of customer segmentations of the existing insurance policy information in the computer memory;
    a computer scoring and premium estimation model;
    a real-time function execution module; and
    a user interface device;
    wherein a subset of prospective insurance customer policy criteria is communicated through the user interface device to the real-time function execution module;
    wherein the computer scoring and premium estimation model uses the subset of prospective insurance customer policy criteria and the customer segmentations of the existing insurance policy information in the computer memory to determine peer group policy information;
    wherein the peer group policy information is communicated from the real-time function execution module through the user interface device; and
    wherein the peer group policy information promotes disclosure of complete prospective insurance customer policy criteria to obtain an insurance policy quote.

2. A process of providing peer group insurance policy information relative to a prospective insurance customer based on a subset of prospective insurance customer policy criteria to promote disclosure of complete prospective insurance customer policy criteria, the process comprising:
    segmenting existing customer insurance policy information into multiple customer segments in a computer memory via a computer segmentation module of a computer system, wherein the computer segmentation module is configured to segment the existing insurance policy information based on insurance policy criteria selected from: an age of an insured, a gender of the insured, a type of property insured, details regarding the property insured, a presence of alarms associated with the property insured, and a number of accidents, citations received by the insured, or claims filed by the insured within a specified timeframe;
    wherein the database stores representative information regarding customer segment comprising at least one statistic relating to: the dollar value of insurance premiums paid by customers in that segment, coverages elected by customers in that segment, limits elected by customers in that segment, deductibles elected by customers in that segment, and other products owned by customers in that segment;

communicating a subset of prospective insurance customer policy criteria through a user interface device to a real-time function execution module of a computer system;

using the subset of prospective insurance customer policy criteria and the customer segmentations of the existing customer insurance policy information in the computer memory to determine peer group policy information;

communicating the peer group policy information from the real-time function execution module through the user interface device; and promoting disclosure of complete prospective insurance customer policy criteria via the peer group policy information, wherein the complete prospective insurance customer policy criteria is useable to obtain an insurance policy quote.

3. A computer system configured to provide peer group insurance policy information relative to a prospective insurance customer based on a subset of prospective insurance customer policy criteria to promote disclosure of complete prospective insurance customer policy criteria, the computer system comprising:

a computer memory comprising a database of existing insurance policy information regarding multiple insurance policies;

a computer segmentation module configured to:
generate two or more segments of the existing insurance policy information based on insurance policy criteria selected from: an age of an insured, a gender of the insured, a type of property insured, details regarding the property insured, a presence of alarms associated with the property insured, and a number of accidents, citations received by the insured, or claims filed by the insured within a specified timeframe;

wherein each existing insurance policy is associated with exactly one segment; and determine representative information about the existing policy information associated with each segment, the representative information comprising at least one statistic relating to: the dollar value of insurance premiums paid by customers in that segment, coverages elected by customers in that segment, limits elected by customers in that segment, deductibles elected by customers in that segment, and other products owned by customers in that segment;

a real-time function execution module in communication with the computer segmentation module and the computer memory, wherein the real-time function execution module is configured to select a target segment based on a subset of prospective insurance customer policy criteria; and a user interface device configured to:
transmit the subset of prospective insurance customer policy criteria to the real-time function, and
receive for display representative information associated with the target segment selected by the real-time function.

4. The computer system of claim 3, wherein the user interface comprises a standalone Internet application.

5. The computer system of claim 3, wherein the subset of prospective insurance customer policy criteria comprises non-identifying demographic information about the prospective insurance customer.

6. The computer system of claim 3, wherein the subset of prospective insurance customer policy criteria comprises non-identifying location information about the prospective insurance customer.

7. The computer system of claim 3, wherein the subset of prospective insurance customer policy criteria comprises non-identifying information about a property of the prospective insurance customer.

8. A process of providing peer group insurance policy information relative to a prospective insurance customer based on a subset of prospective insurance customer policy criteria to promote disclosure of complete prospective insurance customer policy criteria, the process comprising:

segmenting existing customer insurance policy information in a computer memory by a segmentation module of a computer system to produce a set of segments of existing customer policy information, the segmentation module segmenting the existing customer insurance policy information based on insurance policy criteria selected from: an age of an insured, a gender of the insured, a type of property insured, details regarding the property insured, a presence of alarms associated with the property insured, and a number of accidents, citations received by the insured, or claims filed by the insured within a specified timeframe;

determining representative information about the existing customer policy information associated with each segment, the representative information comprising at least one statistic relating to: the dollar value of insurance premiums paid by customers in that segment, coverages elected by customers in that segment, limits elected by customers in that segment, deductibles elected by customers in that segment, and other products owned by customers in that segment;

communicating a subset of prospective insurance customer policy criteria through a user interface device to a real-time function execution module of a computer system;

using the subset of prospective insurance customer policy criteria and the set of segments of existing customer policy information to determine peer group policy information;

communicating the peer group policy information from the real-time function execution module through the user interface device; and promoting disclosure of complete prospective insurance customer policy criteria via the peer group policy information, wherein the complete prospective insurance customer policy criteria is useable to obtain an insurance policy quote.

9. The process of claim 8, wherein the subset of prospective insurance customer policy criteria comprises non-identifying demographic information about the prospective insurance customer.

10. The process of claim 8, wherein the subset of prospective insurance customer policy criteria comprises non-identifying location information about at least one of the prospective insurance customer and property.

* * * * *